(12) United States Patent
Nakatani

(10) Patent No.: US 10,145,402 B2
(45) Date of Patent: Dec. 4, 2018

(54) TELESCOPING DEVICE

(71) Applicant: VELBON KABUSHIKI KAISHA, Tokyo (JP)

(72) Inventor: Koichiro Nakatani, Tokyo (JP)

(73) Assignee: VELBON KABUSHIKI KAISHA, Tokyo (JP)

( * ) Notice: Subject to any disclaimer, the term of this patent is extended or adjusted under 35 U.S.C. 154(b) by 324 days.

(21) Appl. No.: 14/889,085

(22) PCT Filed: Mar. 20, 2014

(86) PCT No.: PCT/JP2014/057797
§ 371 (c)(1),
(2) Date: Nov. 4, 2015

(87) PCT Pub. No.: WO2015/140990
PCT Pub. Date: Sep. 24, 2015

(65) Prior Publication Data
US 2016/0077412 A1 Mar. 17, 2016

(51) Int. Cl.
*F16B 7/14* (2006.01)
*F16B 2/14* (2006.01)
(Continued)

(52) U.S. Cl.
CPC ............... *F16B 7/149* (2013.01); *F16B 2/14* (2013.01); *F16M 11/26* (2013.01);
(Continued)

(58) Field of Classification Search
CPC ...... F16B 2/06; F16B 2/65; F16B 2/14; F16B 7/14; F16B 7/1424; F16B 7/1445;
(Continued)

(56) References Cited

U.S. PATENT DOCUMENTS 2,455,525 A     12/1948  Schulz
2,508,039 A  *   5/1950  Neuwirth .............. F16B 7/1463
                                                         248/188.5
(Continued)

FOREIGN PATENT DOCUMENTS

DE         1145443 B  *  3/1963  .............. F16B 7/149
DE    102004018839 A1  * 11/2005  ............ F16B 7/1463
(Continued)

OTHER PUBLICATIONS

International Search Report dated Jun. 24, 2014 issued in corresponding PCT Application No. PCT/JP2014/057797.
(Continued)

*Primary Examiner* — Josh Skroupa
(74) *Attorney, Agent, or Firm* — Troutman Sanders LLP

(57) ABSTRACT

A telescoping device including an upper tubular body, a lower tubular body, and a fixing unit that releasably fixes the lower tubular body with respect to the upper tubular body. The fixing unit includes an operation body and a fixation body. The fixation body consists of an outer member, an upper inner member, and a lower inner member. On the outer member, inner peripheral upward inclined surfaces and inner peripheral downward inclined surfaces are formed. On the upper inner member, outer peripheral downward inclined surfaces are formed, and on the lower inner member, outer peripheral upward inclined surfaces are formed.

4 Claims, 9 Drawing Sheets

(51) Int. Cl.
*F16M 11/26* (2006.01)
*G03B 17/56* (2006.01)

(52) U.S. Cl.
CPC ..... *G03B 17/561* (2013.01); *Y10T 403/32501* (2015.01); *Y10T 403/7077* (2015.01)

(58) Field of Classification Search
CPC ....... F16B 7/1463; F16B 7/149; F16M 11/26; G03B 17/561; Y10T 403/32491; Y10T 403/32501; Y10T 403/7077
USPC .................................. 403/109.4, 109.5, 377
See application file for complete search history.

(56) References Cited

U.S. PATENT DOCUMENTS

| | | | | |
|---|---|---|---|---|
| 2,999,706 | A * | 9/1961 | Wilcox | F16B 7/1463 403/370 |
| 3,227,113 | A * | 1/1966 | Kupski | F16B 7/1463 108/148 |
| 4,823,919 | A * | 4/1989 | Hayatdavoudi | E21B 19/10 403/377 |
| 4,856,929 | A * | 8/1989 | Smahlik | F16B 7/1463 248/161 |
| 6,076,797 | A * | 6/2000 | Schnautz | B29C 33/04 220/235 |
| 6,202,663 | B1 * | 3/2001 | Uemura | A45B 9/00 403/109.5 |
| 6,860,672 | B2 * | 3/2005 | Kim | E04C 5/165 403/109.5 |

FOREIGN PATENT DOCUMENTS

| | | | | |
|---|---|---|---|---|
| EP | 2113674 A1 | * | 11/2009 | ............ F16B 7/1463 |
| JP | S51-134435 U | | 10/1976 | |
| JP | H09-230491 A | | 9/1997 | |
| JP | S11-052482 A | | 2/1999 | |
| JP | 2004-258451 A | | 9/2004 | |
| JP | 2006312994 A | | 11/2006 | |
| WO | 2003024545 A1 | | 3/2003 | |

OTHER PUBLICATIONS

Office Action dated Jun. 24, 2015 issued in corresponding Japanese Patent Application No. 2014-536027.

* cited by examiner

PRIOR ART

TELESCOPING DEVICE

CROSS-REFERENCE TO RELATED APPLICATION

This application in the National Stage of International Application No. PCT/JP2014/057797 filed on Mar. 20, 2014. This application also published as WO 2015/140990 on Sep. 24, 2015. All of the above applications are incorporated herein by reference in their entirety.

TECHNICAL FIELD

The present invention relates to a telescoping device being telescopic.

BACKGROUND

Conventionally, support devices such as camera support devices (tripods and monopods, etc.) that support cameras are widely known (for example, refer to Japanese Laid-Open Patent Publication No. 2004-258451).

This kind of support device includes a leg body that is a telescoping device being telescopic, and this leg body is constituted, for example, as shown in FIG. 9.

The leg body 1 shown in FIG. 9 includes an upper tubular body 2, a lower tubular body 3 inserted movably inside the upper tubular body 2, and a fixing unit 4 that releasably fixes the lower tubular body 3 with respect to the upper tubular body 2.

The fixing unit 4 includes an operation nut 6 screwed to the outer peripheral side of the lower end portion of the upper tubular body 2, and a fixing ring 7 disposed between the operation nut 6 and the lower tubular body 3.

When the operation nut 6 is operated in one direction, the fixing ring 7 is pressure-bonded to the outer peripheral surface of the lower tubular body 3, and accordingly, the lower tubular body 3 is fixed with respect to the upper tubular body 2. When the operation nut 6 is operated in the other direction, pressure bonding of the fixing ring 7 is released, and accordingly, the fixation of the lower tubular body 3 with respect to the upper tubular body 2 is released.

SUMMARY

However, in the conventional constitution, the lower tubular body 3 may jounce when it is fixed by the fixing unit 4.

That is, for example, in a state where the leg body 1 is expanded and the lower tubular body 3 is fixed with respect to the upper tubular body 2 by the fixing unit 4, the lower tubular body 3 may move so as to swing around the point P shown in FIG. 9 with respect to the upper tubular body 2.

The present invention was developed in view of these circumstances, and an object thereof is to provide a telescoping device capable of preventing the lower tubular body from jouncing when it is fixed by the fixing unit.

A telescoping device according to an example of the present invention includes an upper tubular body, a lower tubular body inserted movably inside the upper tubular body, and a fixing unit that releasably fixes the lower tubular body with respect to the upper tubular body, wherein the fixing unit includes an operation body provided on the upper tubular body and a fixation body that releasably fixes the lower tubular body with respect to the upper tubular body based on an operation of the operation body, the fixation body includes an outer member having an inner peripheral upward inclined surface expanding in diameter upward and an inner peripheral downward inclined surface expanding in diameter downward, an upper inner member having an outer peripheral downward inclined surface that comes into contact with the inner peripheral upward inclined surface, and a lower inner member having an outer peripheral upward inclined surface that comes into contact with the inner peripheral downward inclined surface, and when the operation body is operated in one direction, the upper inner member and the lower inner member are pressure-bonded to the outer peripheral surface of the lower tubular body, and accordingly, the lower tubular body is fixed with respect to the upper tubular body, and when the operation body is operated in the other direction, pressure bonding of the upper inner member and the lower inner member is released, and accordingly, fixation of the lower tubular body with respect to the upper tubular body is released.

The telescoping device according to another example of the present invention is featured in that, in the telescoping device according to the above example, the outer member has a plurality of inner peripheral upward inclined surfaces on the upper portion inner peripheral side and a plurality of inner peripheral downward inclined surfaces on the lower portion inner peripheral side, and the upper inner member has a plurality of outer peripheral downward inclined surfaces that come into contact with the inner peripheral upward inclined surfaces on the outer peripheral side, and the lower inner member has a plurality of outer peripheral upward inclined surfaces that come into contact with the inner peripheral downward inclined surfaces on the outer peripheral side.

The telescoping device according to a further example of the present invention is featured in that, in the telescoping device according to the above examples, the lower inner member has a pressed surface being along the direction orthogonal to the axial direction of the lower tubular body on the lower end face, and the operation body has a pressing surface that presses the pressed surface.

The telescoping device according to a yet further example of the present invention is featured in that, in the telescoping device according to any of the above examples, the upper inner member and the lower inner member are spaced from each other and opposed to each other via a space.

The telescoping device according to the present invention is featured in that the outer member is formed of a plurality of divided members divided in the circumferential direction.

According to the present invention, the lower tubular body can be prevented from jouncing when it is fixed by the fixing unit.

DETAILED DESCRIPTION

Examples of the telescoping device according to the present invention are described with reference to FIG. 1 to FIGS. 8.

Figure 7A:
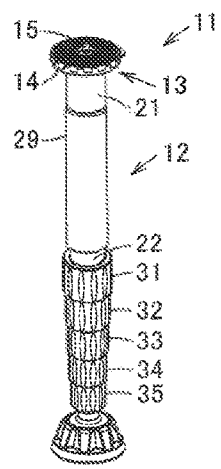
FIGS. 7 (a) and (b) are perspective views of a monopod including the same telescoping device, and FIG. 7 (a) is a view in a contracted state, and FIG. 7 (b) is a view in an expanded state.

In FIG. 7, the reference symbol 11 denotes a monopod as a support device that supports a supported object (not illustrated). The supported object is, for example, an optical device such as a camera.

The monopod 11 includes a leg body 12 being one telescoping device which is longitudinal and whose longitudinal direction is in the up-down direction, and which is expandable and contractible along the longitudinal direction, and a support body 13 that is attached to the upper end portion of the leg body 12 and supports a supported object.

The support body 13 includes a disk-shaped support plate 14 that supports a supported object (not illustrated) such as a camera, and at the central portion of this support plate 14, an attaching screw 15 is provided.

The leg body 12 includes at least an upper tubular body 21, a lower tubular body 22 that is inserted movably in the up-down direction (axial direction) inside the upper tubular body 21, and can adjust its projecting length projecting from the lower end of the upper tubular body 21 by moving with respect to the upper tubular body 21, and a fixing unit 31 that releasably fixes the lower tubular body 22 with respect to the upper tubular body 21.

That is, for example, in the example shown in FIG. 7, the leg body 12 is multitiered, for example, six-tiered, and includes a plurality of, for example, six cylindrical (including substantially cylindrical, the same applies hereafter) first to sixth tubular bodies 21 to 26 whose diameters are slightly different from each other, and a plurality of, for example, five first to fifth fixing units 31 to 35 provided on the lower end sides of the tubular bodies 21 to 25.

To the upper end portion of the uppermost tubular body 21, the support body 13 is attached, and to the lower end portion of the lowermost tubular body 26, a shoe 30 is attached. To the outer peripheral side of the uppermost tubular body 21, a grip 29 formed of a cylindrical foamed rubber is fitted.

Here, the upper tubular body 21 includes, as shown in FIGS. 1, and 3 to 6, a cylindrical upper tubular member 41 and a cylindrical member (cylindrical portion) 42 which has a cylindrical shape and the upper portion of which is fitted and fixed to the outer peripheral side of the lower end portion of the upper tubular member 41. For example, the upper tubular member 41 and the cylindrical member 42 may be integrated.

On the inner peripheral surface of the upper tubular member 41, two projecting portions 43 as rotation stoppers longitudinal in the up-down direction and spaced from each other and opposed to each other are formed.

At one position on the upper portion outer peripheral surface of the cylindrical member 42, a convex portion 45 being a contact receiving portion having a substantially oval shape longitudinal in the up-down direction is formed. The convex portion 45 is formed from the vicinity of the upper end portion of the cylindrical member 42 to the vicinity of the central portion in the up-down direction of the cylindrical member 42 on the upper portion outer peripheral side of the cylindrical member 42. The convex portion 45 has a contact receiving surface 46 longitudinal in the up-down direction on one surface (front surface in the fixing direction a) along the up-down direction (refer to FIG. 6). The surface on the opposite side of the contact receiving surface 46, that is, the other surface along the up-down direction (front surface in the fixation releasing direction b) of the convex portion 45 is an opposed surface 50.

On the lower portion outer peripheral surface of the cylindrical member 42, an outer peripheral threaded portion 47 formed of a spiral groove is formed. On the inner peripheral surface of the central portion in the up-down direction of the cylindrical member 42, an inward projecting portion 48 having a circular annular shape along the circumferential direction of the cylindrical member 42 is formed.

The lower tubular body 22 includes, as shown in FIGS. 1, and 3 to 6, a cylindrical lower tubular member 51 having a diameter smaller than that of the upper tubular member 41, and a cylindrical stopper member (stopper portion) 52 that is fitted and fixed to the outer peripheral side of the upper end portion of the lower tubular member 51 and prevents the lower tubular body 22 from coming out from the inside of the upper tubular body 21. For example, the lower tubular member 51 and the stopper member 52 may be integrated.

On the inner peripheral surface of the lower tubular member 51, two projecting portions 53 as rotation stoppers longitudinal in the up-down direction and spaced from each other and opposed to each other are formed. To the outer peripheral side of the lower end portion of the lower tubular member 51, a cylindrical member (not illustrated) similar to the cylindrical member 42 is fixed.

The stopper member 52 consists of a plurality of, for example, two divided members 54 having curved plate shapes divided in the circumferential direction of the stopper member 52. Each divided member 54 has a circular fitting convex portion 55 on the inner surface side, and this fitting convex portion 55 is fit into the hole portion 56 of the upper end portion of the lower tubular member 51. Between opposed end portions of both divided members 54, the projecting portion 43 of the upper tubular member 41 is inserted.

The fixing unit 31 includes, as shown in FIG. 1 to FIG. 6, a cylindrical operation body 61 that is screwed to the outer peripheral side of the lower end portion of the upper tubular body 21, that is, the outer peripheral threaded portion 47 of the cylindrical member 42 and is capable of being operated to turn around the vertical turning central axis with respect to the cylindrical member 42, and a cylindrical fixation body 62 that is disposed between the lower end portion inner peripheral surface of the upper tubular body 21 (the inner peripheral surface of the cylindrical member 42) and the outer peripheral surface of the lower tubular body 22, and releasably fixes the lower tubular body 22 with respect to the upper tubular body 21 based on a turning operation of the operation body 61. The fixation body 62 is sandwiched between the inward projecting portion 48 of the cylindrical member 42 and an annular plate portion 69 projecting inward of the operation body 61.

The operation body 61 consists of, for example, a screwing member 64 being a cylindrical lock nut screwed to the outer peripheral threaded portion 47 of the cylindrical member 42 of the upper tubular body 21, a cylindrical operation member 65 fitted to the outer peripheral side of the screwing member 64 by spline fitting, and a cylindrical cover member 66 made of rubber that is fitted to the outer peripheral side of the operation member 65 and covers the operation member 65 and the screwing member 64.

Figure 3:
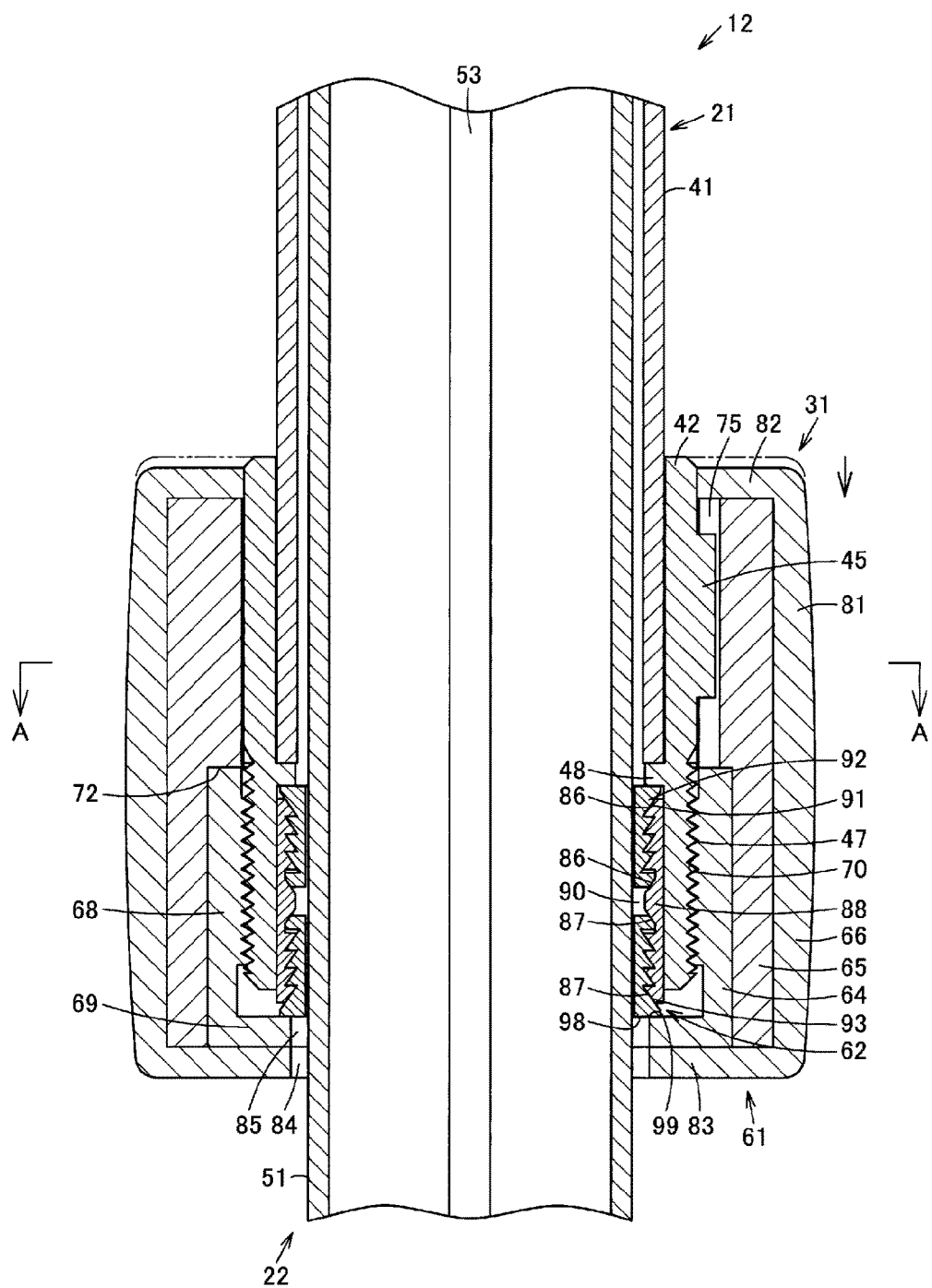
FIG. 3 is a sectional view of the same telescoping device when fixation by the fixing unit is released (unlocked).

The screwing member 64 includes, as shown in FIG. 3, etc., a cylindrical portion 68 having a cylindrical shape, and from the lower end portion inner peripheral surface of the cylindrical portion 68, the annular plate portion 69 having a circular annular shape projects integrally inward. The fixation body 62 is sandwiched between the inward projecting portion 48 of the cylindrical member 42 and the annular plate portion 69 projecting inward of the operation body 61.

On the inner peripheral surface of the cylindrical portion 68, an inner peripheral threaded portion 70 that is threadably mounted on the outer peripheral threaded portion 47 of the cylindrical member 42 is formed. On the outer peripheral surface of the cylindrical portion 68, a plurality of outer peripheral grooves 71 along the axial direction are formed (refer to FIG. 1). On the lower portion inner peripheral surface of the operation member 65, a plurality of inner peripheral grooves 72 that correspond to the outer peripheral grooves 71 of the screwing member 64 are formed along the axial direction.

At a predetermined portion on the upper portion inner peripheral surface of the operation member 65, a recessed concave portion 75 is formed to be notched from the upper end face. That is, the concave portion 75 is formed from the upper end face of the operation member 65 to the central portion in the up-down direction of the operation member 65 on the upper portion inner peripheral side of the operation member 65. In this concave portion 75, the convex portion 45 on the outer peripheral side of the cylindrical member 42 is inserted movably in the circumferential direction of the operation member 65 with respect to the concave portion 75 and accommodated.

Figure 4:
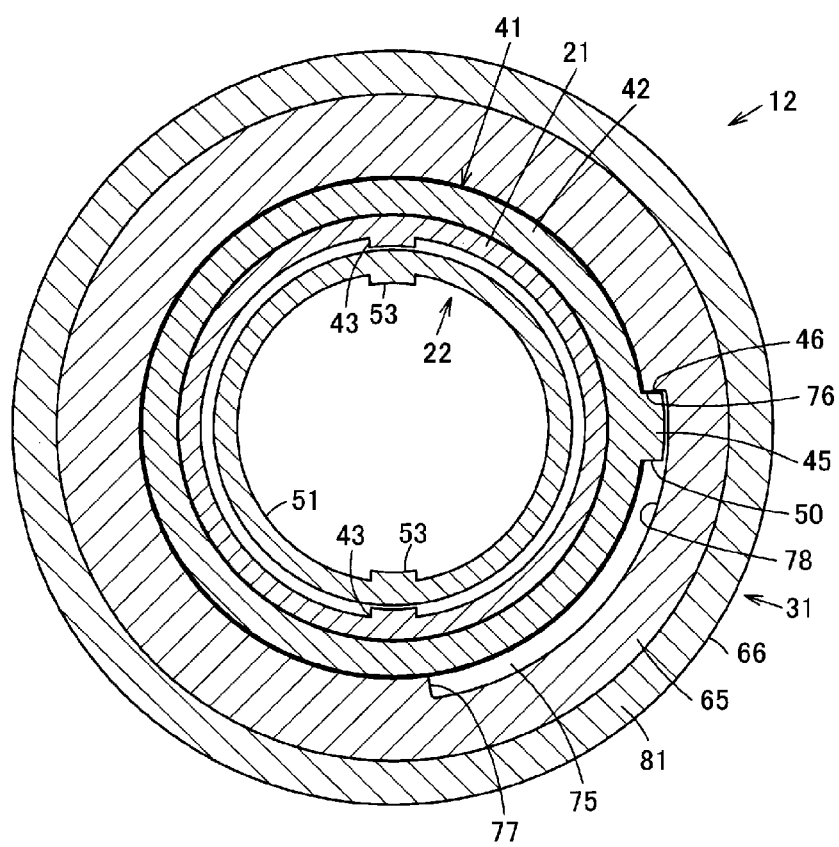
FIG. 4 is a sectional view along A-A in FIG. 3.
Figure 6:
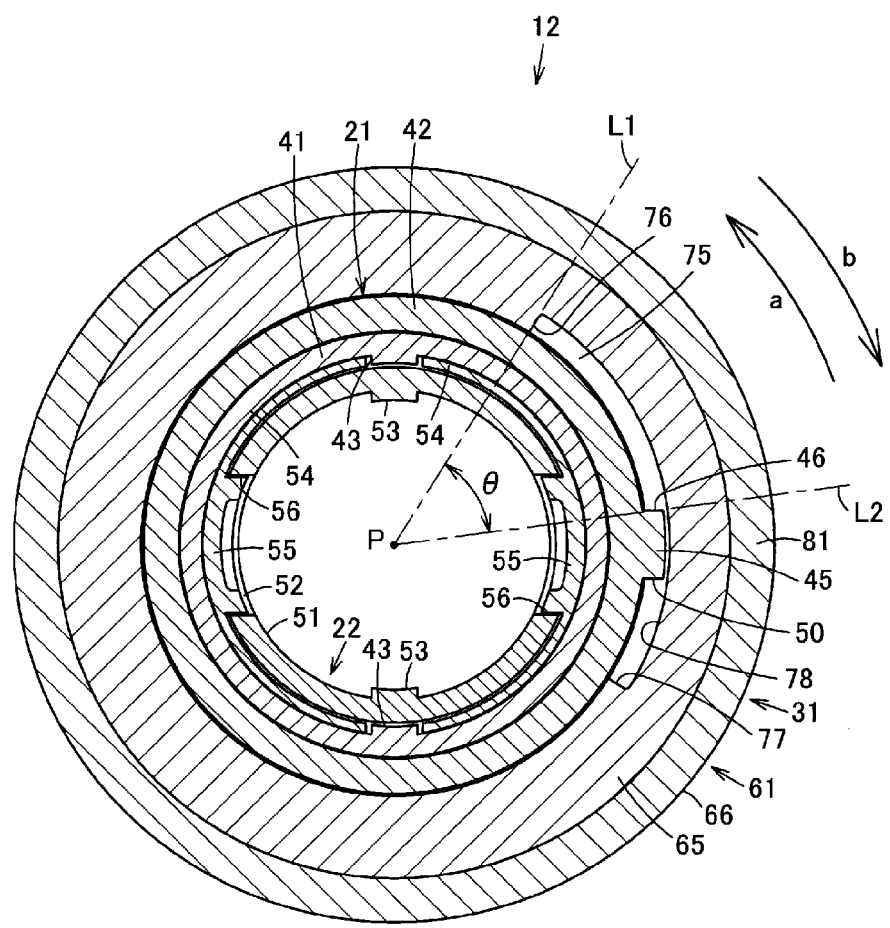
FIG. 6 is a sectional view along B-B in FIG. 5.

As shown in FIG. 4 and FIG. 6, etc., one surface that is longitudinal in the up-down direction and positioned along the radial direction of the operation member 65 of the concave portion 75 of the operation member 65 serves as a contact surface 76 that comes into contact with the contact receiving surface 46 of the convex portion 45. The other surface that is longitudinal in the up-down direction and positioned along the radial direction of the operation member 65 of the concave portion 75 of the operation member 65 is an opposed surface 77 spaced from and opposed to the opposed surface 50 of the convex portion 45.

Further, an arc surface positioned along the circumferential direction of the operation member 65 of the concave portion 75 of the operation member 65 serves as an arc surface 78 that is opposed to the outer peripheral surface of the cylindrical member 42.

When the operation body 61 is turned in the fixation releasing direction b, the contact surface 76 of the concave portion 75 comes into contact with the contact receiving surface 46 of the convex portion 45, however, when the operation body 61 is turned in the fixing direction a, the opposed surface 77 of the concave portion 75 does not come into contact with the opposed surface 50 of the convex portion 45.

Further, the cover member 66 includes, as shown in FIG. 3, etc., a cylindrical portion 81 having a cylindrical shape covering the entire outer peripheral surface of the operation member 65. The upper annular plate portion 82 having a circular annular shape integrally projects inward from the upper end portion inner peripheral surface of the cylindrical portion 81, and the inner peripheral surface of the upper annular plate portion 82 comes into contact with the upper end portion outer peripheral surface of the cylindrical member 42. In addition, the lower annular plate portion 83 having a circular annular shape integrally projects inward from the lower end portion inner peripheral surface of the cylindrical portion 81, and by this lower annular plate portion 83, the lower surface of the screwing member 64 is covered.

Between the inner peripheral surface of the lower annular plate portion 83 of the cover member 66 and the outer peripheral surface of the lower tubular body 22, a first space 84 is present. Similarly, between the inner peripheral surface of the annular plate portion 69 of the screwing member 64 and the outer peripheral surface of the lower tubular body 22, a second space 85 communicated with the first space 84 is present, and the upper face of the second space 85 is closed by a pressed surface 98 that is described later.

Figure 1:
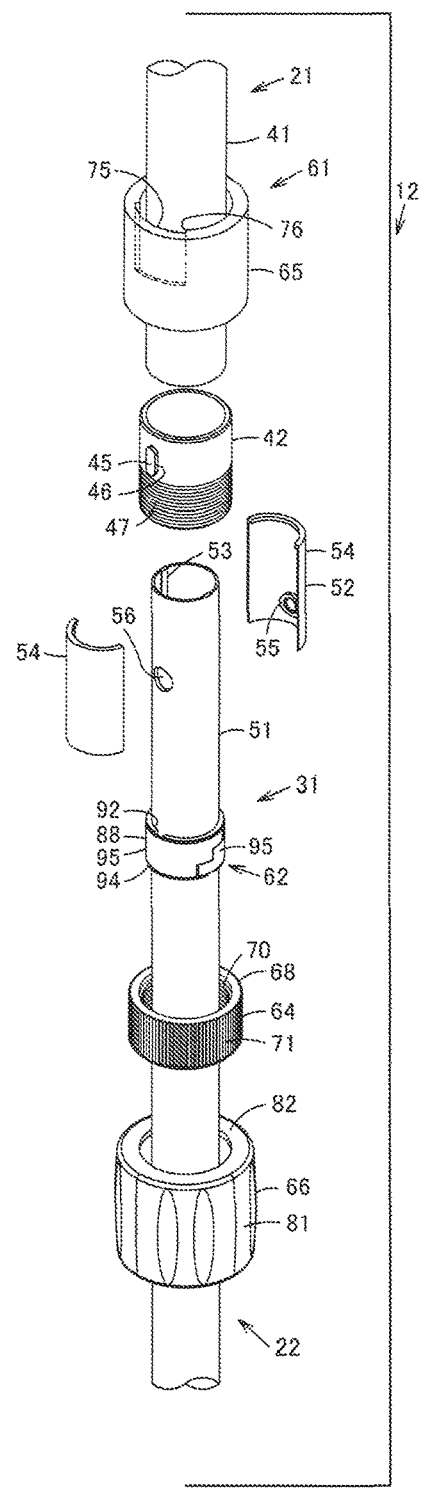
FIG. 1 is an exploded perspective view of a telescoping device (leg body) according to an example of the present invention.
Figure 2:
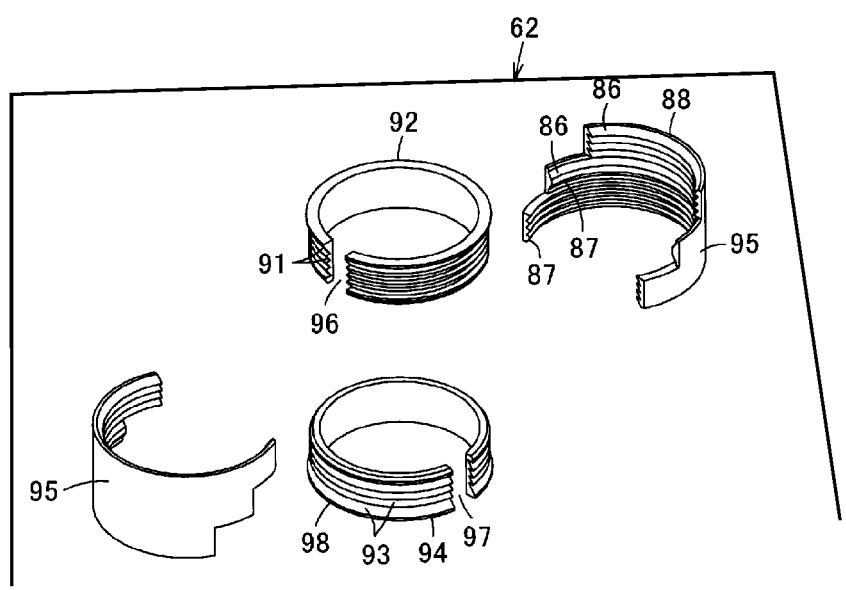
FIG. 2 is an exploded perspective view of a fixation body of a fixing unit of the same telescoping device.

The fixation body 62 consists of, as shown in FIG. 2 and FIG. 3, etc., a cylindrical outer member 88 that has, for example, a plurality of (for example, five) inner peripheral upward inclined surfaces 86 having truncated conical shapes and gradually expanded in diameter upward on the upper portion inner peripheral side, and a plurality of (for example, five) inner peripheral downward inclined surfaces 87 having truncated conical shapes and gradually expanded in diameter downward on the lower portion inner peripheral side, a cylindrical upper inner member 92 having a plurality of (for example, five) outer peripheral downward inclined surfaces 91 that come into planar contact with the inner peripheral upward inclined surfaces 86 on the outer peripheral side, and a cylindrical lower inner member 94 having a plurality of (for example, five) outer peripheral upward inclined surfaces 93 that come into planar contact with the inner peripheral downward inclined surfaces 87 on the outer peripheral side.

On the outer peripheral side portion of the space portion between the inner peripheral surface of the cylindrical member 42 and the outer peripheral surface of the lower tubular body 22, the outer member 88 is disposed, and on the inner peripheral side portion of the space portion, an upper inner member 92 and a lower inner member 94 are disposed. Specifically, on the inner peripheral side of one outer member 88, a pair of upper and lower inner members 92 and 94 are disposed in contact with the inner peripheral surface of the outer member 88. The pair of upper and lower inner members 92 and 94 are disposed so as not to come into contact with each other, and the lower end face of the upper inner member 92 and the upper end face of the lower inner member 94 are spaced from each other and opposed to each other via a space 90.

When the operation body 61 is turned (for example, turned by a predetermined angle θ of 90 degrees or less) in a fixing direction a that is one direction, based on a radially inward force to be applied from the outer member 88, the upper inner member 92 and the lower inner member 94 are elastically contracted in diameter and deformed and pressure-bonded to the outer peripheral surface of the lower tubular body 22, and accordingly, the lower tubular body 22 is fixed with respect to the upper tubular body 21.

When the operation body 61 is turned (for example, turned by a predetermined angle θ of 90 degrees or less) in a fixation releasing direction b that is the other direction opposite to the one direction, based on elastic resilience, both inner members 92 and 94 restore to their original shapes and the pressure bonding of the upper inner member 92 and the lower inner member 94 to the outer peripheral surface of the lower tubular body 22 is released, and accordingly, the fixation of the lower tubular body 22 with respect to the upper tubular body 21 is released. Due to this fixation release, the lower tubular body 22 becomes movable in the axial direction with respect to the upper tubular body 21.

The predetermined angle θ of turning the operation body 61 with respect to the cylindrical member 42 is, for example, 90 degrees or less, and preferably, an angle within the range of 40 to 60 degrees, for example, 50 degrees. In FIG. 6, the point P is a point on the turning central axis of the operation body 61, and an angle formed between the line L1 passing through the contact surface 76 of the operation body 61 positioned at the fixed position and the point P and the line L2 passing through the contact receiving surface 46 of the cylindrical member 42 and the point P is the predetermined angle θ.

Here, the outer member 88 is formed of a plurality of, for example, two divided members 95 divided in the circumferential direction of the outer member 88. The upper end face of one divided member 95 is formed into a stepped shape, and the lower end face of the other divided member 95 is formed into a stepped shape. On the upper portion inner peripheral surface of each divided member 95, a plurality of inner peripheral upward inclined surfaces 86 arranged vertically and parallel to each other are formed, and on the lower portion inner peripheral surface of each divided member 95, a plurality of inner peripheral downward inclined surfaces 87 arranged vertically and parallel to each other are formed. That is, the outer member 88 has serrated mountains directed differently from each other on the inner peripheral side. The outer member 88 and the lower inner member 94 are slightly movable in the up-down direction with respect to the upper tubular body 21 based on the turning operation of the operation body 61.

The upper inner member 92 has a C shape with a notched portion 96 so as to easily contract in diameter and deform, and on the outer peripheral surface of the upper inner member 92, a plurality of outer peripheral downward inclined surfaces 91 arranged vertically and parallel to each other are formed corresponding to the inner peripheral upward inclined surfaces 86. That is, the upper inner member 92 has a serrated mountain on the outer peripheral side. The upper end face of the upper inner member 92 is always in contact with the inward projecting portion 48 of the cylindrical member 42. Due to the contact between the upper end face of the upper inner member 92 and the lower end face of the stopper member 52, the lower tubular body 22 is prevented from coming out from the inside of the upper tubular body 21.

Further, the lower inner member 94 also has a C shape with a notched portion 97 so as to easily contract in diameter and deform like the upper inner member 92, and on the outer peripheral surface of the lower inner member 94, a plurality of outer peripheral upward inclined surfaces 93 arranged vertically and parallel to each other are formed corresponding to the inner peripheral downward inclined surfaces 87. That is, the lower inner member 94 has a serrated mountain whose direction is different from that of the serrated mountain of the upper inner member 92 on the outer peripheral side.

The lower inner member 94 has a horizontal pressed surface 98 being along a direction orthogonal to the axial direction of the lower tubular body 22 on the lower end face. The pressed surface 98 is pressed upward by the pressing surface 99 of the screwing member 64 based on a turning operation in the fixing direction of the operation body 61. This pressing surface 99 is formed into a planar shape on the upper surface of the annular plate portion 69 of the screwing member 64, that is, on the inner peripheral portion of the upper surface of the annular plate portion 69 along the direction orthogonal to the axial direction of the screwing member 64, and is always in contact with the pressed surface 98.

The first and second tubular bodies 21 and 22 and the first fixing unit 31 are described above, and other tubular bodies 23 to 26 and fixing unit 32 to 35 are also constituted similarly.

Figure 8A:
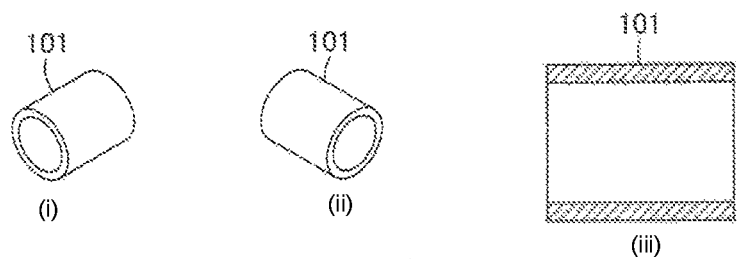
FIGS. 8 (a)(i), (ii), (iii), FIGS. 8(b) (i), (ii), (iii), and FIGS. 8(c) (i), (ii), (iii) are explanatory views for describing a method for manufacturing a cylindrical member.
Figure 8B:
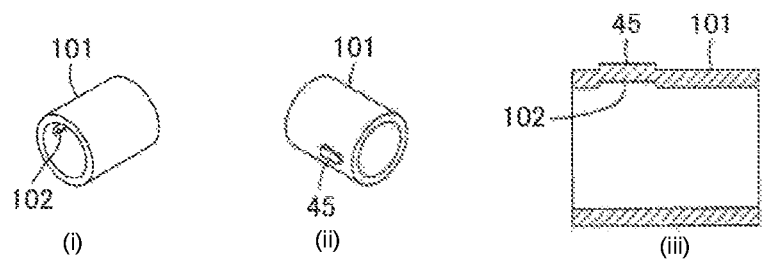
Figure 8C:
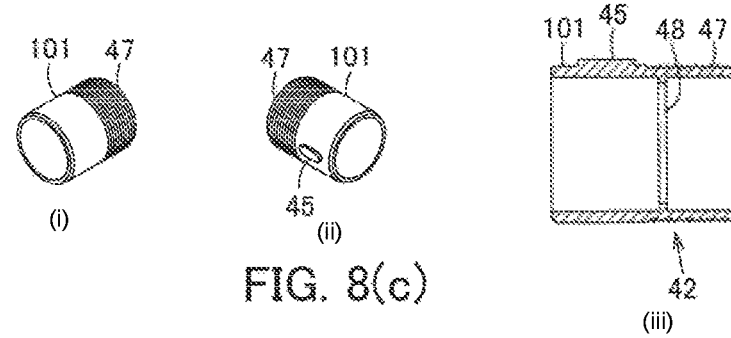
Figure 9:
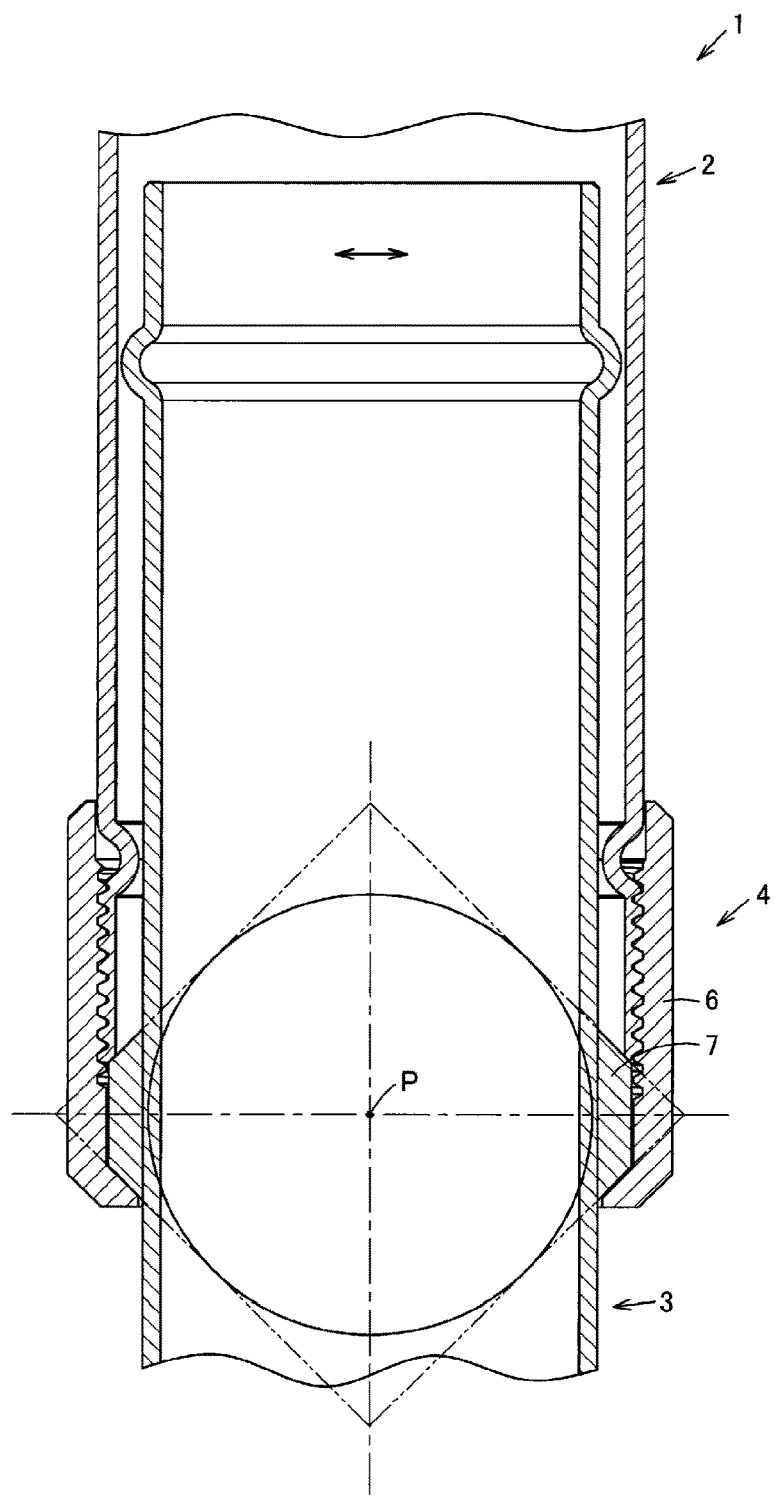
FIG. 9 is a sectional view of a conventional telescoping device.

Here, FIG. 8 is a drawing for describing a method for manufacturing the cylindrical member 42, and by referring to this drawing, the method for manufacturing the cylindrical member 42 is described.

The cylindrical member 101 shown in FIGS. 8(*a*)(i), (ii), (iii) is made of a metal such as aluminum, and both of the inner peripheral surface and the outer peripheral surface are formed into cylindrical surfaces.

First, as shown in FIG. 8(*b*) (i), (ii), (iii), by press working with a pressing machine, the substantially oval convex portion 45 is formed to project outward on the outer peripheral surface of the cylindrical member 101. At the time of this press working, on the inner peripheral surface of the cylindrical member 101, a substantially oval concave portion 102 is formed.

Thereafter, as shown in FIGS. 8(*c*) (i), (ii), (iii), by cutting work using a lathe, the outer peripheral threaded portion 47 is formed on the outer peripheral surface of the cylindrical member 101, and a circular annular inward projecting portion 48 is formed on the inner peripheral surface of the cylindrical member 101.

Thus, the cylindrical member 42 having the convex portion 45, the outer peripheral threaded portion 47, and the inward projecting portion 48 is completed. When attaching the completed cylindrical member 42 to the upper tubular member 41, the lower end portion of the upper tubular member 41 is fitted into the cylindrical member 42 until the lower end face of the upper tubular member 41 comes into contact with the inward projecting portion 48 of the cylindrical member 42.

The cylindrical member 42, the tubular members 41 and 51, the stopper member 52, the screwing member 64, and the operation member 65 are made of a metal, for example, aluminum or the like, and the outer member 88, the upper inner member 92, and the lower inner member 94 constituting the fixation body 62 are made of a synthetic resin, for example, POM or the like.

Next, operation, etc., of the above-described examples are described.

For example, after the length of the leg body 12 of the monopod 11 is adjusted to a desired length, when the lower tubular body 22 is fixed by the fixing unit 31 with respect to the upper tubular body 21, a user of the monopod 11 turns the operation body 61 toward the fixing direction a by a predetermined angle θ of 90 degrees or less.

That is, the user turns the operation body 61 by a predetermined angle θ in the tightening direction with respect to the cylindrical member 42.

Figure 5:
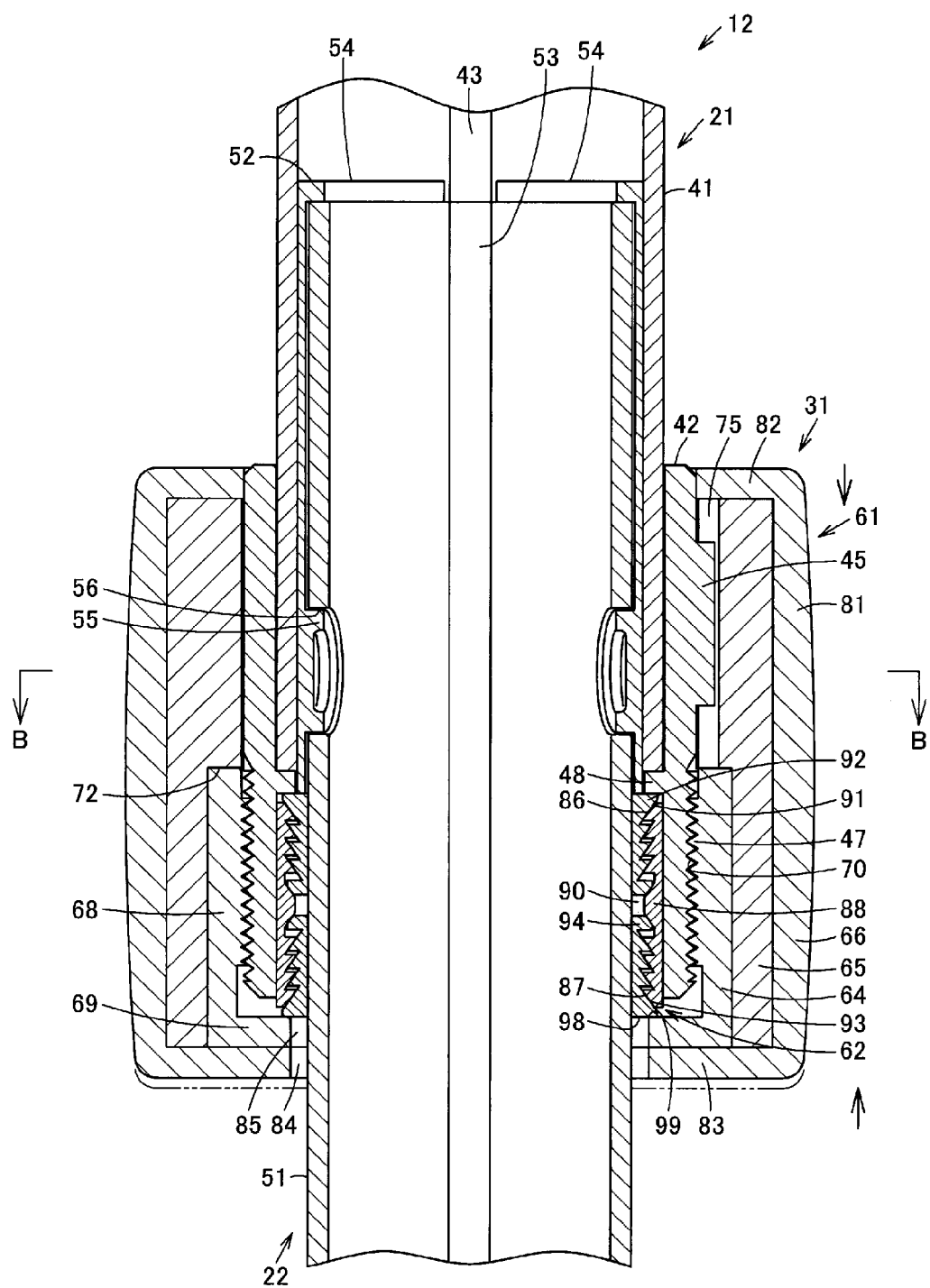
FIG. 5 is a sectional view of the same telescoping device during fixation (locking) by the fixing unit.

Then, as shown in FIG. 5 and FIG. 6, the upper inner member 92 and the lower inner member 94 of the fixation body 62 is pressure-bonded to the outer peripheral surface of the lower tubular body 22, and by this pressure bonding, the lower tubular body 22 is fixed with respect to the upper tubular body 21.

That is, when the operation body 61 slightly moves up according to turning in the fixing direction a, the pressed surface 98 of the lower inner member 94 is pressed upward by the pressing surface 99 of the operation body 61.

As a result, the upper inner member 92 and the lower inner member 94 are elastically contracted in diameter and deformed based on a radially inward force applied from the inclined surfaces 86 and 87 of the outer member 88, and the inner peripheral surfaces of these inner members 92 and 94 are pressed against and pressure bonded and fixed to the outer peripheral surface of the lower tubular body 22. At this time, the lower inner member 94 and the outer member 88 slightly move up with respect to the cylindrical member 42. The upper inner member 92 is in contact with the inward projecting portion 48, so that the upper inner member 92 does not move up.

Figure 7B:
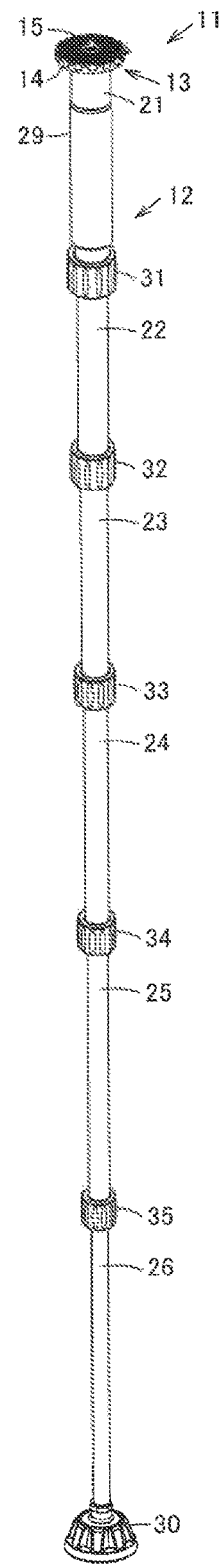

Thus, the lower tubular body (lower pipe) 22 is fixed with respect to the upper tubular body (upper pipe) 21 by the fixing unit 31. Then, during this fixation by the fixing unit 31, the lower tubular body 22 is firmly fixed with respect to the upper tubular body 21 by a sufficient fixing force applied by the pair of upper and lower inner members 92 and 94, so that the lower tubular body 22 does not jounce or swing with respect to the upper tubular body 21. That is, as shown in FIG. 7(b), even in the case where the leg body 12 of the monopod 11 is expanded to the maximum length and fixed by the fixing units 31 to 35, the connecting portions (joint portions) between the adjacent tubular bodies 21 to 26 do not bend and the state where the leg body 12 extends straight is maintained.

For example, even when the inner peripheral threaded portion 70 jounces with respect to the outer peripheral threaded portion 47, the pressing surface 99 of the operation body 61 slides with respect to the pressed surface 98 of the lower inner member 94, so that the sufficient fixing force generated by both inner members 92 and 94 is kept.

Next, for example, to release the fixation performed by the fixing unit 31, the user of the monopod 11 turns the operation body 61 toward the fixation releasing direction b by a predetermined angle θ of 90 degrees or less. That is, the user turns the operation body 61 by a predetermined angle θ in a loosening direction with respect to the cylindrical member 42.

Then, as shown in FIG. 3 and FIG. 4, the pressure bonding of the upper inner member 92 and the lower inner member 94 to the outer peripheral surface of the lower tubular body 22 is released, and by this pressure bonding release, the fixation of the lower tubular body 22 with respect to the upper tubular body 21 is released.

That is, when the operation body 61 slightly moves down according to turning in the fixation releasing direction b, pressing on the pressed surface 98 by the pressing surface 99 of the operation body 61 is released.

As a result, the upper inner member 92 and the lower inner member 94 restore to their original shapes based on elastic resilience, and the inner peripheral surfaces of these inner members 92 and 94 slightly separate from the outer peripheral surface of the lower tubular body 22, and pressure bonding of the inner members 92 and 94 to this outer peripheral surface is released. At this time, the lower inner member 94 and the outer member 88 slightly move down with respect to the cylindrical member 42.

When the fixation of the lower tubular body 22 with respect to the upper tubular body 21 is released by turning the operation body 61 in the fixation releasing direction b, the contact surface 76 of the concave portion 75 of the operation body 61 comes into contact with the contact receiving surface 46 of the convex portion 45 of the upper tubular body 21, and by this contact, the operation body 61 is restricted from being turned in the fixation releasing direction b.

That is, the contact surface 76 of the concave portion 75 comes into contact with the contact receiving surface 46 of the convex portion 45, so that the user turns the operation body 61 by a predetermined angle θ around the vertical turning central axis in the fixation releasing direction b without excessively turning the operation body 61 toward the fixation releasing direction b more than necessary.

Thus, the fixation of the lower tubular body 22 with respect to the upper tubular body 21 by the fixing unit 31 is released. Then, when this fixation by the fixing unit 31 is released, by moving the lower tubular body 22 with respect to the upper tubular body 21, the length of the leg body 12 of the monopod 11 can be adjusted.

According to the example described above, the tubular bodies 22 to 26 can be prevented from jouncing during fixation by the fixation bodies 62 of the fixing units 31 to 35, and therefore, for example, stable photography with a camera can be performed by using the monopod 11.

The fixation body 62 consists of the outer member 88, the upper inner member 92, and the lower inner member 94, the outer member 88 has a plurality of inner peripheral upward inclined surfaces 86 and a plurality of inner peripheral downward inclined surfaces 87, the upper inner member 92 has a plurality of outer peripheral downward inclined surfaces 91, and the lower inner member 94 has a plurality of outer peripheral upward inclined surfaces 93, so that the tubular bodies 22 to 26 can be properly prevented from jouncing during fixation by the fixing units 31 to 35.

Further, the lower inner member 94 has the pressed surface 98 being along the direction orthogonal to the axial direction of the lower tubular body 22 on the lower end face, and the operation body 61 has the pressing surface 99 that presses the pressed surface 98 of the lower inner member 94, so that without influences of jouncing of the inner peripheral threaded portion 70 of the operation body 61 with respect to the outer peripheral threaded portion 47 of the upper tubular body 21, the tubular bodies 22 to 26 can be more properly prevented from jouncing during fixation by the fixing units 31 to 35.

In addition, by turning the operation body 61 by a predetermined angle θ of 90 degrees or less, fixation of the lower tubular body 22 with respect to the upper tubular body 21 and release of the fixation are performed, so that the operability is excellent.

Further, when the fixation of the lower tubular body 22 with respect to the upper tubular body 21 is released by turning the operation body 61, the operation body 61 is restricted from being turned in the fixation releasing direction by contact between the contact surface 76 and the contact receiving surface 46, so that the operation body 61 can be properly prevented from being excessively turned in the fixation releasing direction.

In the example described above, the case where the telescoping device is the leg body 12 of the monopod 11 is described, however, the telescoping device may be, for example, a leg body of a tripod, or may be other than a leg body of a support device.

The constitution of the telescoping device is not limited to the constitution including six tubular bodies 21 to 26 and five fixing units 31 to 35, and any constitution is allowed as long as the constitution includes at least two tubular bodies 21 and 22 and one fixing unit 31.

Further, the numbers of inner peripheral upward inclined surfaces 86, inner peripheral downward inclined surfaces 87, outer peripheral downward inclined surfaces 91, and outer peripheral upward inclined surfaces 93 of the fixation body 62 are arbitrary, and may be plural, or may be one.

In addition, a constitution is also allowed in which, for example, when the lower tubular body 22 is fixed with respect to the upper tubular body 21 by turning the operation body 61, the operation body 61 is restricted from being turned in the fixing direction a by contact between the opposed surface 50 of the convex portion 45 of the cylindrical member 42 and the opposed surface 77 of the concave portion 75 of the operation body 61.

The present invention is utilized for, for example, a leg body, etc., being telescopic of a support device.

The invention claimed is:

1. A telescoping device comprising:
   an upper tubular body;
   a lower tubular body inserted movably inside the upper tubular body; and
   a fixing unit that releasably fixes the lower tubular body with respect to the upper tubular body, wherein the fixing unit comprises:
   an operation body provided on the upper tubular body, and
   a fixation body that releasably fixes the lower tubular body with respect to the upper tubular body based on an operation of the operation body,
   wherein the fixation body comprises:
   an outer member having plurality of inner peripheral upward inclined surfaces having truncated conical shapes and expanding in diameter upward that is one side in an axial direction and plurality of inner peripheral downward inclined surfaces having truncated conical shapes and expanding in diameter downward that is the other side of the outer member in an axial direction,
   an upper inner member being disposed on the inner peripheral side of the outer member and having a plurality of outer peripheral downward inclined surfaces that come into contact with the inner peripheral upward inclined surface on the outer peripheral side, and
   a lower inner member being disposed on the inner peripheral side of the outer member and having a plurality of outer peripheral upward inclined surfaces that come into contact with the inner peripheral downward inclined surface on the outer peripheral side,
   when the operation body is operated in one direction that is one side in the circumferential direction, the upper inner member and the lower inner member are elastically contracted in diameter and deformed and pressure-bonded to the outer peripheral surface of the lower tubular body, and accordingly, the lower tubular body is fixed with respect to the upper tubular body, and
   when the operation body is operated in the other direction that is the other side in the circumferential direction, based on the elastic resilience, the upper inner member and the lower inner member restore to their original shapes and pressure bonding of the upper inner member and the lower inner member to the outer peripheral surface of the lower tubular body is released, and accordingly, fixation of the lower tubular body with respect to the upper tubular body is released.

2. The telescoping device according to claim 1, wherein the lower inner member has a pressed surface being along a direction orthogonal to the axial direction of the lower tubular body on the lower end face, and the operation body has a pressing surface that presses the pressed surface.

3. The telescoping device according to claim 1, wherein the upper inner member and the lower inner member are spaced from each other and opposed to each other via a space.

4. The telescoping device according to claim 1, wherein the outer member is formed of a plurality of divided members divided in the circumferential direction.

* * * * *